United States Patent [19]
Arai

[11] Patent Number: 5,067,318
[45] Date of Patent: Nov. 26, 1991

[54] REGENERATION SYSTEM FOR PARTICULATE TRAP

[75] Inventor: Minoru Arai, Fujisawa, Japan

[73] Assignee: Isuzu Motors Limited, Tokyo, Japan

[21] Appl. No.: 524,466

[22] Filed: May 17, 1990

[30] Foreign Application Priority Data

Jun. 16, 1989 [JP] Japan .................... 1-153935

[51] Int. Cl.$^5$ .............................. F01N 3/02
[52] U.S. Cl. ............................ 60/286; 60/288; 55/283; 55/DIG. 30
[58] Field of Search .............. 60/285, 286, 288; 55/283, DIG. 30

[56] References Cited

U.S. PATENT DOCUMENTS 4,450,682  5/1984  Sato ...................... 60/286
4,974,414 12/1990  Kono ..................... 60/286

FOREIGN PATENT DOCUMENTS 60-108520  6/1985  Japan .
63-295815 12/1988  Japan .
77717     3/1989  Japan .................... 60/286

Primary Examiner—Douglas Hart
Attorney, Agent, or Firm—Staas & Halsey

[57] ABSTRACT

A regeneration system for a particulate trap provided in an exhaust pipe of an engine in which the regeneration is initiated when the pressure loss across the trap has reached a preset value and then the preset value is renewed when the peak value of the trap temperature through the regeneration resides outside a predetermined range or when the pressure loss after the regeneration exceeds the preset value even though the peak value resides within said predetermined range, and the initial value of said preset value is determined on the basis of the minimum value within the variation of the pressure loss of cleaned traps.

8 Claims, 5 Drawing Sheets

REGENERATION SYSTEM FOR PARTICULATE TRAP

BACKGROUND OF THE INVENTION

The present invention relates to a system for regenerating a particulate trap in an exhaust gas of a diesel engine etc., and in particular to a system for determining/controlling the time of initiation of the regeneration of the particulate trap.

In a conventional regeneration system for a particulate trap (hereinafter abbreviated as a trap), the regeneration of the trap is generally initiated by regeneration means such as an electric heater and a burner when one of the following conditions is satisfied:

(i) When the pressure loss (pressure difference) between the inlet and the outlet of the trap reaches a reference value preset in a memory map having stored therein reference pressure losses in relation to engine conditions such as revolution as a parameter;

(ii) When the quantity of trapped particulates which is estimated from the intake air flow rate of the engine measured by an air flow meter and the pressure loss of the trap reaches a predetermined value;

(iii) When the quantity of trapped particulates indicated by the ratio between the pressure loss of the trap and the pressure loss of a silencer as a fixed wringer provided at the outlet of the trap reaches a predetermined value as disclosed in Japanese Patent Application Laid-open No. 60-108520;

(iv) When the present pressure loss of the trap reaches a trapped pressure loss determined from the gas flow rate further determined from the pressure difference across an inlet valve of the trap when the opening of the inlet valve is fixed in a predetermined range as disclosed in Japanese Patent Application Laid-open No. 63-295815 by this inventor.

It is to be noted that the condition of the initiation of the regeneration of whether or not the integrated value of the number of revolutions of an engine or the running distance of a car reaches a predetermined value should not be practically used in terms of precision since the effect of the engine load is fully neglected.

Such a conventional regeneration system for a particulate trap which determines the initiation time of the regeneration on the basis of the pressure loss of the trap on the above conditions (i)~(iv), takes no account of the clean state of a trap. Namely, in spite of the variation of the pressure loss under the pre-use condition of traps, the initiation time of the regeneration is uniformly determined assuming that the pressure loss under the clean state is the same for any trap.

Therefore, it is disadvantageous that the quantity of trapped particulates has a variation which provides unpreferable regeneration, resulting in an excessive regeneration which melts the trap and in an incomplete regeneration which leaves particulates.

SUMMARY OF THE INVENTION

Accordingly, it is an object of the present invention to provide a regeneration system for a particulate trap provided in an exhaust pipe of an engine, wherein the occurrence of various pressure losses under the clean state of the trap is reduced upon the determination/control of the initiation time of the regeneration of the trap.

For the achievement of the above noted object, a regeneration system for a particulate trap according to the present invention comprises; means (10, 11) for sensing the pressure loss across said trap (2), means (4) for sensing the temperature of said trap (2), and control means (13) for initiating the regeneration when said pressure loss has reached a preset value, and then for renewing said preset value when the peak value of said temperature through the regeneration resides outside a predetermined range, the initial value of said preset value being determined on the basis of the minimum value within the variation of the pressure loss of cleaned traps.

In the present invention, the control means has preset therein the pressure loss of the trap for initiating the regeneration thereof.

The initial value of the preset pressure loss is determined on the basis of the minimum value (see FIG. 3) within the variation of pressure losses under the clean state (pre-use state) of several traps as extracted. Namely, the pressure loss of the minimum value plus conventional pressure loss (see FIG. 5) estimated by experiments etc. which can increase through an adequate trapping operation, is initially preset in the control means.

When the actual pressure loss provided as an output from the pressure loss sensing means reaches the preset value of the pressure loss, the regeneration of the trap is initiated.

After the conventional regeneration of the trap has finished, the control means checks whether or not the peak value of the trap temperature sensed by the temperature sensing means is within a predetermined range.

When the peak value resides outside a predetermined range, the preset value is renewed to shift the regeneration time in the next regeneration process.

Thus, by the repetition of those regenerations, the preset value of the pressure loss of any trap will converge into such a certain value that the peak temperature may be confined within the predetermined range.

Therefore, the effect of the fluctuation of the pressure loss according to the accumulation of pariculates occurring due to the insufficiency of the regeneration can also be corrected in a similar manner to the variation of pressure losses under the cleaned state.

In this case, the control means may increment or decrement the preset value by a predetermined value ($\Delta p$) respectively when the peak value is below or not below a lower limit temperature ($T_1$).

In this case, the control means may detect an abnormal condition when the preset value exceeds a permissible maximum value or falls below a permissible minimum value.

Alternatively, the control means (13) may decrement the preset value by a predetermined value ($\Delta p$) when the pressure loss after the regeneration exceeds said preset value even though the peak value resides within the above predetermined range.

Also, in this case, the control means (13) may detect an abnormal condition when the preset value exceeds a permissible maximum value.

BRIEF DESCRIPTION OF THE DRAWINGS

The present invention will now be more apparent to those skilled in the art from the attached drawings in which.

DETAILED DESCRIPTION OF THE PREFERRED EMBODIMENTS

Hereinafter, an embodiment of a regeneration system for a particulate trap according to the present invention will be described.

Figure 1:
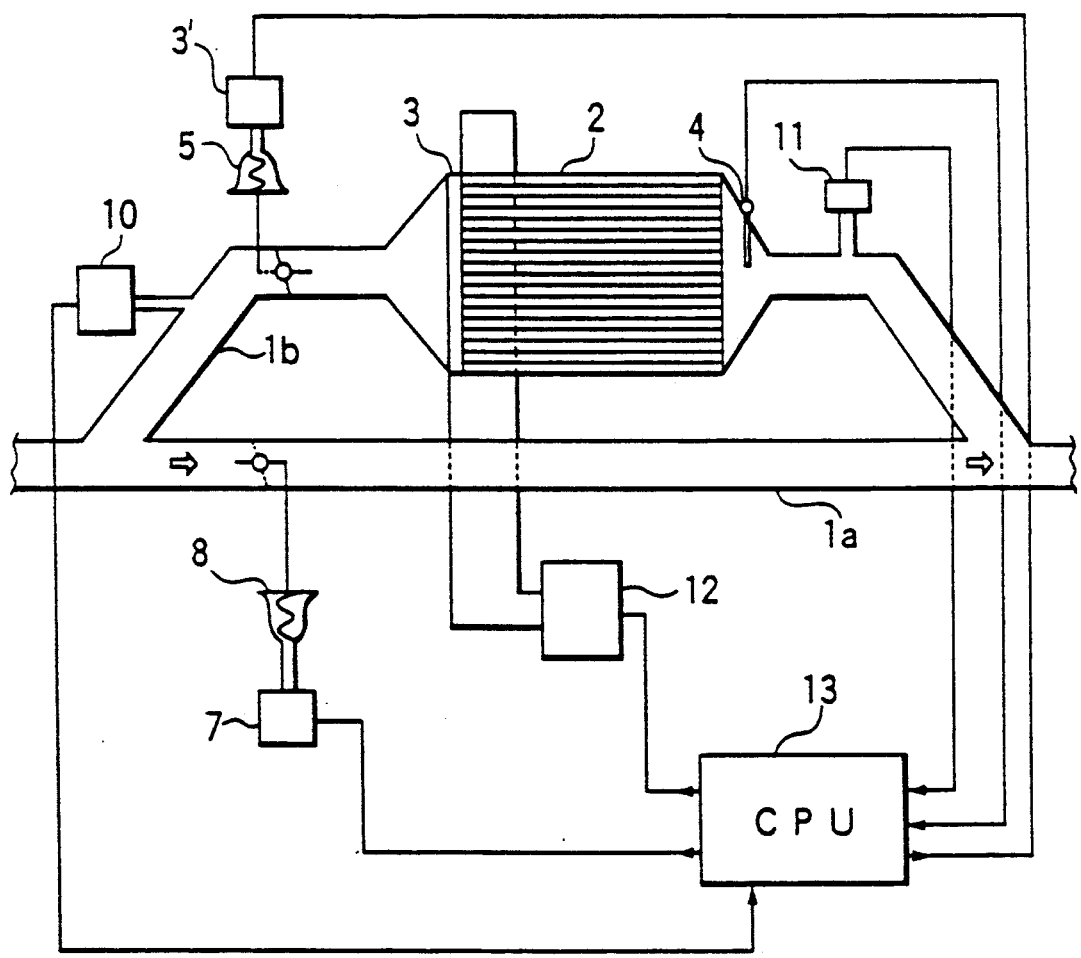
FIG. 1 shows a schematic arrangement of one embodiment of a regeneration system for a particulate trap according to the present invention.

FIG. 1 illustrates the arrangement of an embodiment of the present invention, in which a well-known particulate trap 2 is provided in an exhaust pipe 1a of an engine (not shown). The trap 2 has installed therein an electric heater 3 at the inlet front thereof and a temperature sensor 4 at the outlet side thereof. An inlet valve 5 is provided in a bypass pipe 1b, at the front side of the trap 2, provided across a part of the exhaust pipe 1a and switches the exhaust gas from the engine flowing in the trap 2 under the control of a vacuum control valve (VCV) 3' in the form of an electro-magnetic valve. A bypass valve 8 is provided to bypass the trap 2 and is controlled by a duty-solenoid valve 7 in the form of an electro-magnetic valve. Pressure sensors 10 and 11 are respectively provided at the inlet and outlet of the trap 2. A heater power switch 12 is connected to energize the electric heater 3.

A control unit 13 as control means receives as an input from the sensed signals out of the sensors 4, 10 and 11 to furnish the control signals for the valves 3' and 7 as well as the heater power switch 12. Also, this control unit 13 has therein a memory map for storing and renewing various values as mentioned below.

Figure 2:
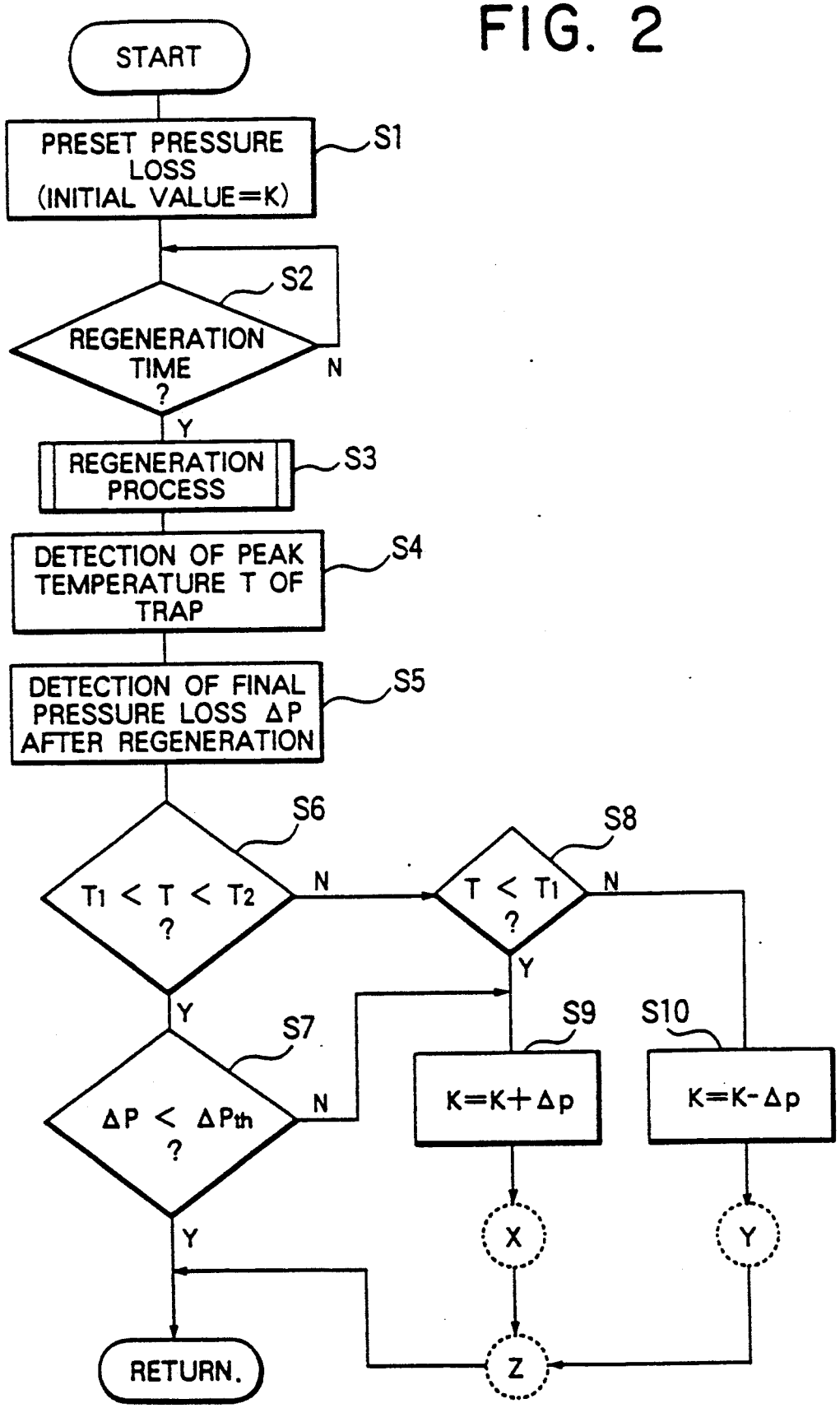
FIG. 2 shows a program flow chart stored in and executed by a controller in FIG. 1 according to the present invention.

FIG. 2 shows a flow chart of a program executed per a fixed period by the controller 13, so that the operation of the regeneration system for a particulate trap shown in FIG. 1 will now be described with reference to the flow chart in FIG. 2.

Starting this program, the control unit 13 initially presets a pressure loss K for determining the initiation time of the regeneration of the trap 2 based on a preset value for pressure losses under the clean state of traps (Step S1 in FIG. 2)

Now, the presetting of the pressure loss K will be described referring to FIG. 3.

Figure 3:
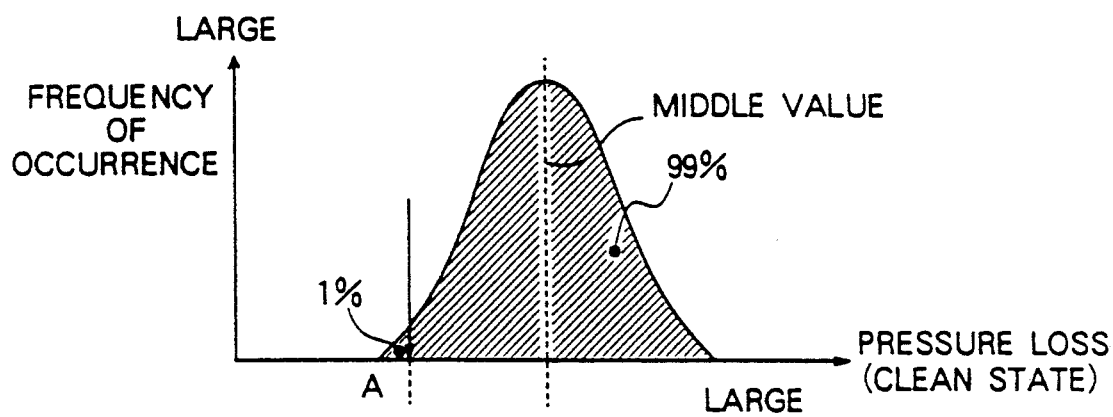
FIG. 3 shows a graph for explaining the variation (frequency of occurrence) of pressure losses under the clean state of traps.

FIG. 3 shows, in the form of a graph, the variation (frequency of occurence) of pressure losses under the clean state, i.e. pre-use of several traps, in which the initial value K for the pressure loss is determined in reference to point A. It is to be noted that the variation of initial pressure losses in the clean state of traps is obtained by the random sampling of trap products.

The point A corresponds to the minimum pressure loss of several cleaned traps as experimented, so that for example, among 100 cleaned traps, 99 traps or 99% thereof have the pressure loss higher than that.

Figure 4:
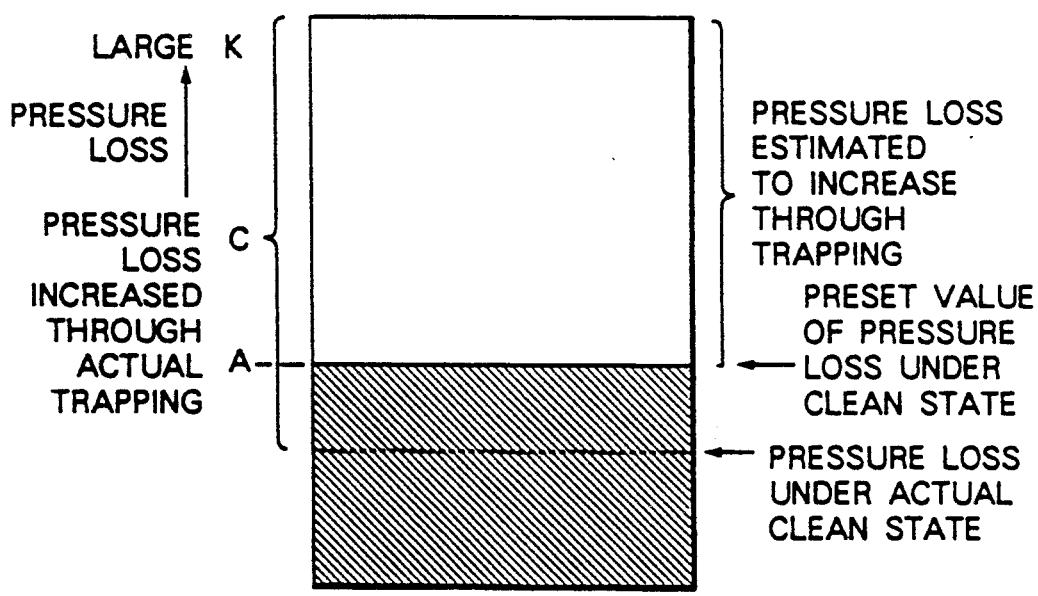
FIGS. 4 and 5 respectively show maps for explaining the selection of the minimum pressure loss in FIG. 3.

The reason why the reference pressure loss A is not preset at the middle of FIG. 3 where the frequency of occurrence of the pressure losses under the clean state is the highest is as follows:

If it is preset at the middle value, any pressure loss under the cleaned state of a half of traps corresponding to the left half of the middle value will be lower than the initially preset pressure loss A as shown in FIG. 4 and the pressure loss C increased through the actual trapping operation up to the pressure loss K (upper limit) will be larger than the pressure loss B estimated, by experiments etc., to increase through an adequate conventional trapping operation, so that the trapped quantity will be excessively increased by the difference C-B, resulting in damage and melting of the trap due to excessive heat generation upon the regeneration.

Figure 5:
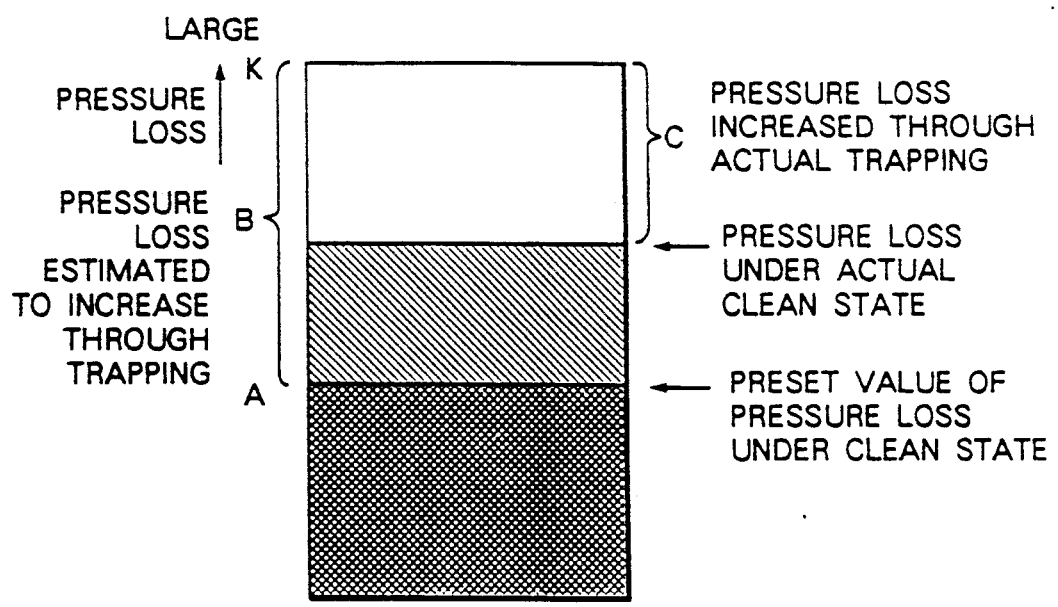

Therefore, the initial value K of the pressure loss set at Step S1 is selected to have the pressure loss of A+B, i.e. the minimum pressure loss A under the clean state plus the pressure loss B increased by an adequate trapping operation as shown in FIG. 5. In this case, most traps (99% in this example) under the cleaned state are to have a pressure loss higher than that as preset.

At Step 2 in FIG. 2, when the present pressure loss of the trap 2 exceeds the pressure loss K preset at Step S1, it is found that the time for the regeneration has come to execute a conventional regeneration process (Step S3).

For one example of the regeneration process at Step S3, under the control of the control unit 13, the inlet valve 5 is closed, the bypass valve 8 is opened, the heater 3 is energized through the heater power switch 12, and when the inlet temperature sensor 4 senses a temperature higher than a preset temperature, the inlet valve 5 and the bypass valve 8 are controlled at a predetermined opening to regenerate the trap 2 for a fixed time interval, and then the heater power switch 12 is made off, thereby deenergizing the heater 3, opening the inlet valve 5, and closing the bypass valve 8 where the program returns to the conventional particulate trapping condition.

During such a regeneration process, the control unit 13 continually reads in the outlet temperature of the trap 2 from the output of the temperature sensor 4 and sequentially stores it (Step S4).

When the regeneration process has ended, the final pressure loss (pressure difference) $\Delta P$ is determined from the pressures read from the pressure sensors 10 and 11 (Step S5).

Figure 6:
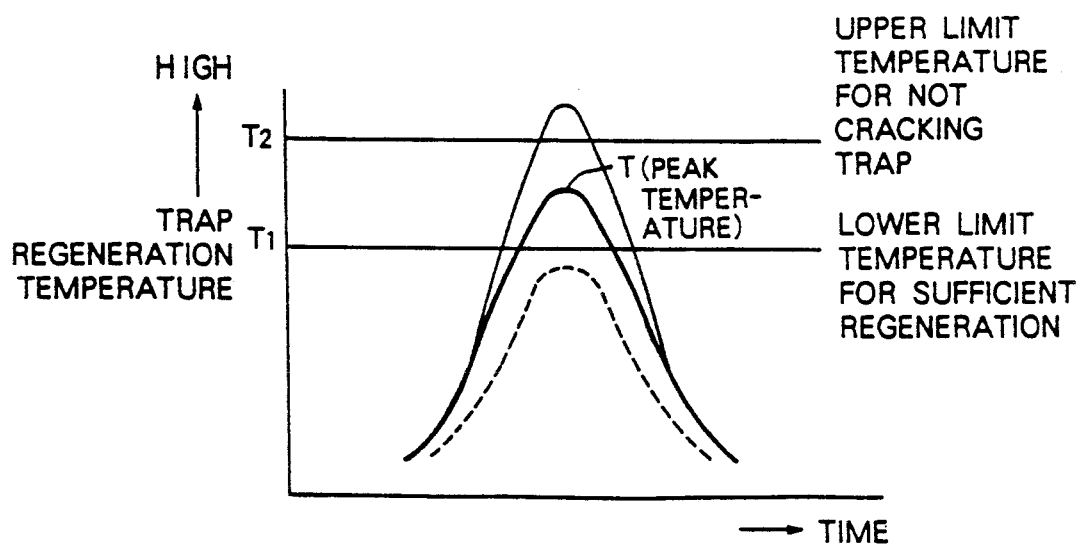
FIG. 6 shows a graph of characteristic curves of the regeneration temperature of the trap in relation to time; and, FIG. 7 show a flow chart to be combined in FIG. 2 to detect abnormal conditions.

Next, whether or not the peak T of the trap temperature sensed at Step S4 is contained within an adequate regeneration temperature range as shown in FIG. 6 between the upper limit temperature $T_2$ above which the trap cracks or melts and the lower limit temperature $T_1$ below which the regeneration can be insufficient, is checked (Step S6).

As a result, if it resides within the adequate temperature range $T_1 < T < T_2$, then whether or not the final pressure loss $\Delta P$ sensed at Step S5 is lower than a preset threshold value $\Delta Pth$ is checked (Step S7).

At Step S7, the decision $\Delta P < \Delta Pth$ indicates that the pressure loss $\Delta P$ is sufficiently reduced by the adequate execution of the regeneration and therefore the initially preset pressure loss K was adequate, so that the program goes to the next execution period.

On the other hand, the decision $\Delta P \geq \Delta Pth$ at Step S7 indicates that a complete combustion could not be made even within such an adequate temperature range because the quantity of the trapped particulates is a little so that non-combusted particulates remain, and that the pressure loss $\Delta P$ was not sufficiently reduced.

Therefore, in the next regeneration process, it is necessary to increase the quantity of trapped particulates to raise the regeneration temperature for a sufficient regeneration, so that the initial pressure loss K is increased by $\Delta p$, and then the program goes to the next execution period (Step S9).

If it is not found at the above Step S6 that $T_1 < T < T_2$, namely it is found that the peak temperature T of the trap was not within such an adequate temperature range, the control unit 13 then checks whether or not $T < T_1$ at Step S8.

The case where $T < T_1$ indicates that the trap temperature T is lower than such an adequate temperature range so that the regeneration is insufficient. Therefore, the regeneration temperature during the next regeneration process is required to be increased, so that the pressure loss K is increased by $\Delta p$ at Step S9.

If it is not found at Step S8 that $T < T_1$, it indicates that $T_2 < T$ in relation to Step S6. Therefore, the trap may be melted due to such a high temperature, so that the initial pressure loss K is reduced by $\Delta p$ (Step S10) (i.e., the opposite of Step S9) to reduce the regeneration temperature upon the next regeneration, and then the program goes to the next execution period.

Thus, in the next program period, the pressure loss preset at Step S1 is kept at K in case of Step S7, is corrected to $K + \Delta p$ in case of Step S9, and is corrected to $K - \Delta p$ in case of Step S11, so that the preset value K of the pressure loss is sequentially renewed.

It is to be noted that throughout the adjustments of the pressure loss K at the above Steps S9 and S10, the repetition of the program will converge the pressure loss into an adequate value in the absence of any abnormal condition in this system or the trap 2 while such abnormal conditions may be judged by the provisions of Steps X, Y, Z shown by dotted lines in FIG. 2.

Figure 7:
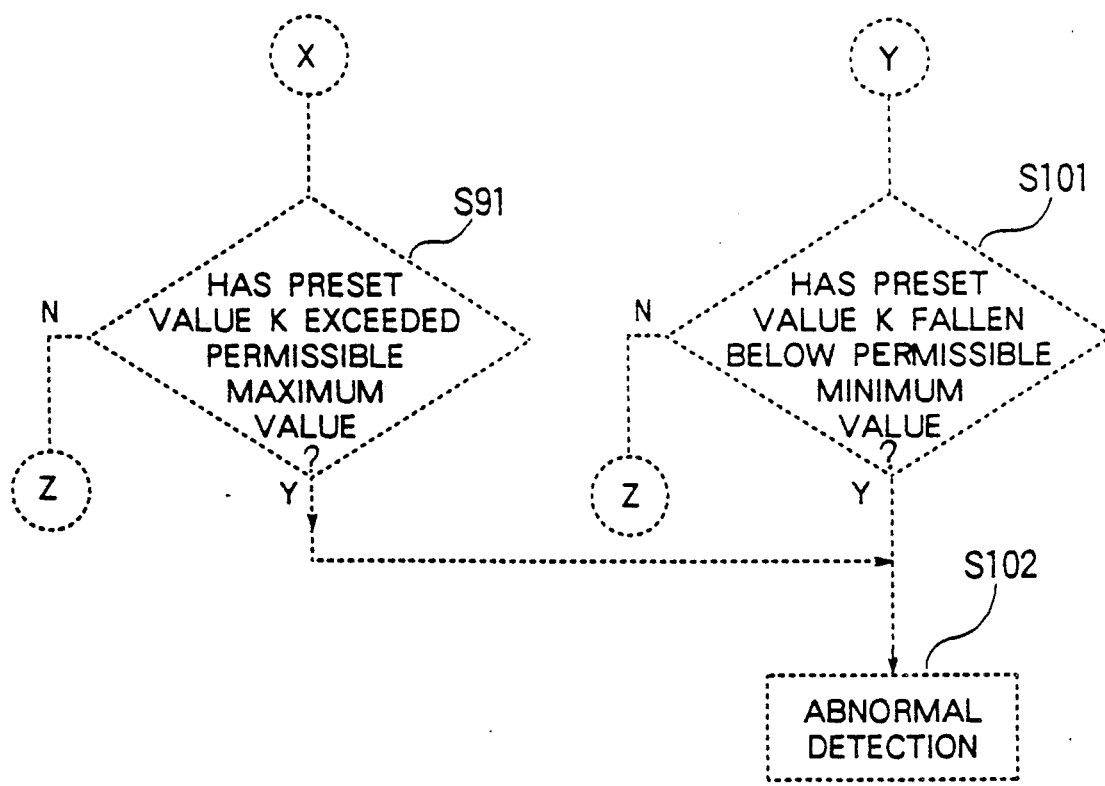

These Steps X, Y, Z are shown in FIG. 7, in which Steps S91 and S101 are respectively executed between Steps S9, S10 and Step S102, and respectively judge the abnormal condition (Step S102 in FIG. 7) when the preset value K of the pressure loss exceeds the permissible maximum value (Step S91 in FIG. 7) or the permissible minimum value (Step S101 in FIG. 7).

It is needless to say that the correction of the upper limit temperature $T_2$ below which the trap can not be cracked and the lower limit temperature $T_1$ above which the regeneration can not be insufficient would result in a more precise regeneration according to atmospheric temperature which may affect the trap temperature.

Also, for the detection of the pressure loss of the trap, a single pressure difference sensor may be connected to the pressure pipes at both sides thereof instead of two pressure sensors.

While a number of alternatives and modifications have been discussed above, it will be appreciated that the invention encompasses all forms and variations within the scope of the appended claims.

I claim:

1. A regeneration system for a particulate trap (2) provided in an exhaust pipe (1) of an engine comprising;
   means (10, 11) for sensing the pressure loss across said trap (2),
   means (4) for sensing the temperature of said trap (2), and
   control means (13) for initiating the regeneration when said pressure loss has reached a preset value, and then for renewing said preset value when the peak value of said temperature through the regeneration resides outside a predetermined range, the initial value of said preset value being determined on the basis of the minimum value within the variation of the pressure loss of cleaned traps.

2. A regeneration system for a particulate trap provided in an exhaust pipe of an engine according to claim 1, wherein said control means (13) increments said preset value by a predetermined value ($\Delta p$) when said peak value is below a lower limit temperature ($T_1$).

3. A regeneration system for a particulate trap provided in an exhaust pipe of an engine according to claim 1, wherein said control means (13) detects an abnormal condition when said preset value exceeds a permissible maximum value.

4. A regeneration system for a particulate trap provided in an exhaust pipe of an engine according to claim 3, wherein said control means (13) decrements said preset value by a predetermined value ($\Delta p$) when said peak value is equal to or above a lower limit temperature ($T_1$).

5. A regeneration system for a particulate trap provided in an exhaust pipe of an engine according to claim 4, wherein said control means (13) detects an abnormal condition when said preset value falls below a permissible minimum value.

6. A regeneration system for a particulate trap provided in an exhaust pipe of an engine according to claim 1, wherein said control means (13) decrements said preset value by a predetermined value ($\Delta p$) when the pressure loss after the regeneration exceeds said preset value, even though said peak value resides within said predetermined range.

7. A regeneration system for a particulate trap provided in an exhaust pipe of an engine according to claim 6, wherein said control means (13) detects an abnormal condition when said preset value exceeds a permissible maximum value.

8. A regeneration system for a particulate trap provided in an exhaust pipe of an engine according to claim 1, wherein said control means stores therein a memory map for the initial value of said preset value and said predetermined range, said memory map renewing said initial value.

* * * * *